United States Patent
Goldschmiedt (10) Patent No.: US 8,092,008 B2
(45) Date of Patent: Jan. 10, 2012

(54) SYSTEM AND METHOD FOR PROTECTING EYE GLASS ARMS DURING HAIR DYE PROCESS, AND MANUFACTURING APPARATUS AND METHOD

(75) Inventor: Philip J. Goldschmiedt, Jersey City, NJ (US)

(73) Assignee: Poly-Version, Inc., Jersey City, NJ (US)

( * ) Notice: Subject to any disclaimer, the term of this patent is extended or adjusted under 35 U.S.C. 154(b) by 340 days.

(21) Appl. No.: 12/426,925

(22) Filed: Apr. 20, 2009

(65) Prior Publication Data
US 2010/0265454 A1   Oct. 21, 2010

(51) Int. Cl.
*G02C 5/14* (2006.01)
(52) U.S. Cl. .......................... 351/122; 351/158
(58) Field of Classification Search ........... 351/122, 351/111, 158, 41
See application file for complete search history.

(56) References Cited

U.S. PATENT DOCUMENTS

| | | |
|---|---|---|
| 2,436,101 A | 2/1948 | Dirlam et al. |
| 2,502,734 A | 4/1950 | Lyons |
| 3,923,577 A | 12/1975 | Baab |
| 3,938,659 A | 2/1976 | Wardwell |
| 4,034,853 A | 7/1977 | Smith |
| 4,786,158 A | 11/1988 | Barfus-Shanks et al. |
| 4,804,432 A | 2/1989 | Jurrius et al. |
| 5,440,355 A * | 8/1995 | Ross .............................. 351/122 |
| 5,583,585 A | 12/1996 | Sternberg et al. |
| 5,956,119 A | 9/1999 | Gibbs |
| 6,039,829 A | 3/2000 | French |
| 6,270,217 B1 | 8/2001 | Lizzi |
| 7,708,400 B2 * | 5/2010 | Coleman et al. .............. 351/122 |

FOREIGN PATENT DOCUMENTS

| | | |
|---|---|---|
| EP | 0 305 281 A2 | 3/1989 |
| FR | 1 519 106 | 7/1978 |
| FR | 2 619 933 A1 | 3/1989 |
| GB | 2 164 540 A | 3/1986 |
| GB | 2 289 616 A | 11/1995 |
| GB | 2 291 394 A | 1/1996 |
| GB | 2 325 521 A | 11/1998 |
| WO | 95/33661 | 12/1995 |

OTHER PUBLICATIONS espacenet English abstract of WO 95/336661.
espacenet English abstract of 0 305 281 A2.
espacenet English abstract of 2 619 933 Al.

* cited by examiner

*Primary Examiner* — Hung Dang
(74) *Attorney, Agent, or Firm* — Ladas & Parry LLP (57) ABSTRACT

A system for protecting eye glass frames during a hair dye, coloring, or highlighting process is described. The system comprises a support layer, a pair of gloves laminated onto the support layer, and a pair of eyeglass arm protectors laminated onto the support layer. Each eyeglass arm protector is formed as a sleeve having an open end. An apparatus and method are also disclosed for manufacturing sections of a support layer material, each section having a pair of gloves and a pair of eyeglass arm protectors laminated thereto.

11 Claims, 4 Drawing Sheets

SYSTEM AND METHOD FOR PROTECTING EYE GLASS ARMS DURING HAIR DYE PROCESS, AND MANUFACTURING APPARATUS AND METHOD

BACKGROUND OF THE INVENTION

1. Field of the Invention

The present invention relates generally to a system and method for protecting eye glass frames during a hair dye, coloring, or highlighting process, and more particularly to protecting the arms or temple pieces of eye glasses from being stained or discolored due to the handling of, or contact with, hair dye chemicals during the coloring process. The present invention also relates to an apparatus and method of manufacturing such a system.

2. Related Art

In typical hair dye, coloring, or highlighting systems, particularly those for self use, the user is provided with a package including various bottles of hair dye chemicals, an applicator, and a folded sheet of paper containing written instructions for using the system. Also typically provided is a pair of plastic disposable gloves. The purpose of the gloves is to protect the user's hands from the chemicals during the hair dye process.

Typically, in using such a system, the user unfolds the paper to access the written instructions and the gloves. The user then puts on the gloves and follows the written instructions. Accordingly, the user wears the gloves while preparing and mixing the chemicals and while applying the mixture to his or her hair. After this first stage of the process is complete, the user waits a predetermined time period (e.g., 40 minutes) before the user begins the next stage. When this predetermined time period is over, the user puts on the gloves again to rinse the hair. Then, conditioner or the like is applied to the hair, typically without using the gloves, before a final rinse is performed. The sheet of paper with the disposable gloves may be manufactured by a process such as that described in U.S. Pat. No. 3,923,577 to Baab, which is hereby incorporated by reference in its entirety, as if fully set forth herein.

In addition to the gloves, which protect the user's hands from the hair dye chemicals, the user may also wear a smock or a towel to protect his or her clothing, or might designate an old towel or shirt to be used or worn "just for coloring." Thus, there are various ways to protect the user's hands and clothing from the chemicals. However, in the Applicant's view, for users who wear eye glasses, there remains a need to protect the eye glasses, specifically the arms or temple pieces thereof, from being stained or discolored during the hair dye process.

SUMMARY OF THE INVENTION

Conventional hair dye processes can be unsatisfactory or problematic for a user who wears eye glasses. First, if the user wears his or her glasses while mixing the chemicals or to refer to the instructions during the preparation process, the arms or temple pieces of the glasses can become stained or discolored when the user removes the glasses in order to apply the chemicals to his or her hair. This is because any chemicals that have gotten onto the user's fingers or gloves during the mixing process would likely be transferred to the arms of the glasses when the user touches them.

Furthermore, if the user were to wear his or her glasses during the predetermined waiting period after the mixture has been applied to the hair, the arms of the glasses would likely become stained or discolored from coming in contact with the chemicals applied to the person's hair. Such predetermined waiting periods can be relatively long; they typically range from approximately 20 minutes to approximately 45 minutes, for example, depending on a number of factors, such as color or shade, whether it is the first time the person has colored his or her hair, whether the person's hair is permed, etc. Accordingly, an unsatisfactory situation is presented in conventional systems in that the user may be inconvenienced during the waiting period if he or she cannot practically wear the glasses.

An example of a fairly well known approach to protecting one's regular pair of glasses during the hair dye process is actually to not use them: the user designates another pair of glasses as a substitute pair, to be worn during the hair dye process instead of the user's regular pair of glasses. Thus, the user wears the designated pair of glasses while preparing the mixture of chemicals and during the waiting period, for example. However, one drawback to this approach is that the "substitute" pair of glasses is unlikely to be the user's current prescription, and therefore the user cannot see as well when wearing them. Moreover, even if the "substitute" pair of glasses is the user's current prescription, another drawback is that a useful "substitute" pair of glasses is effectively wasted, or at least severely limited in its use, since the substitute pair becomes stained or discolored and therefore is typically only worn by the user when he or she colors his or her hair.

There exists, therefore, a need to provide a novel method for protecting eye glasses, particularly the arms or temple pieces thereof, during the hair dye process, that overcomes these and other drawbacks of the existing methods. Since a large segment of hair dye consumers wear eyeglasses, a great many people would benefit from such a novel method.

The present invention can meet the above-identified needs by providing, in one aspect, an improved system and method for protecting eye wear, specifically the arms or temple pieces thereof, from being stained or discolored during the hair dye process. In one example aspect, the system and method includes providing disposable covers or arm protectors for the arms of the eyeglasses, along with disposable gloves, both being removably fixed around their edges by heat and pressure to a sheet of paper containing printed instructions. In another example aspect, the eyeglass arm protectors and/or the gloves would simply be laid onto the sheet of paper without being secured in any way thereto. The present invention can also provide, in another aspect, a manufacturing apparatus and method for producing the system including the sheet containing the eyeglass arm protectors and the gloves.

It is noted that the term "eye wear" as used in this application includes corrective glasses, such as eyeglasses, or even sunglasses. Further, the terms "eyeglasses" and "glasses" are used interchangeably herein, as are the terms "arms" and "temple pieces," and the terms "temple covers" and "arm protectors."

In accordance with one aspect of the present invention, there is provided a system for protecting eye glasses during a hair dye process. The system comprises a support layer, a pair of gloves on the support layer, and a pair of eyeglass arm protectors on the support layer. Each eyeglass arm protector is formed as a sleeve having an open end. The gloves and the eyeglass arm protectors may be laminated onto the support layer, or may be laid onto the support layer without being secured thereto.

The term "laminated" as used in this application refers to a state in which materials such as the support layer and the gloves, or the support layer and the eyeglass arm protectors, are bonded together, at least at designated edges of the gloves or the eyeglass arm protectors. In this way, the materials are removably attached thereto, such as with heat and pressure, so that the user can easily remove the gloves or the eyeglass arm protectors from the support layer.

Figure 1:
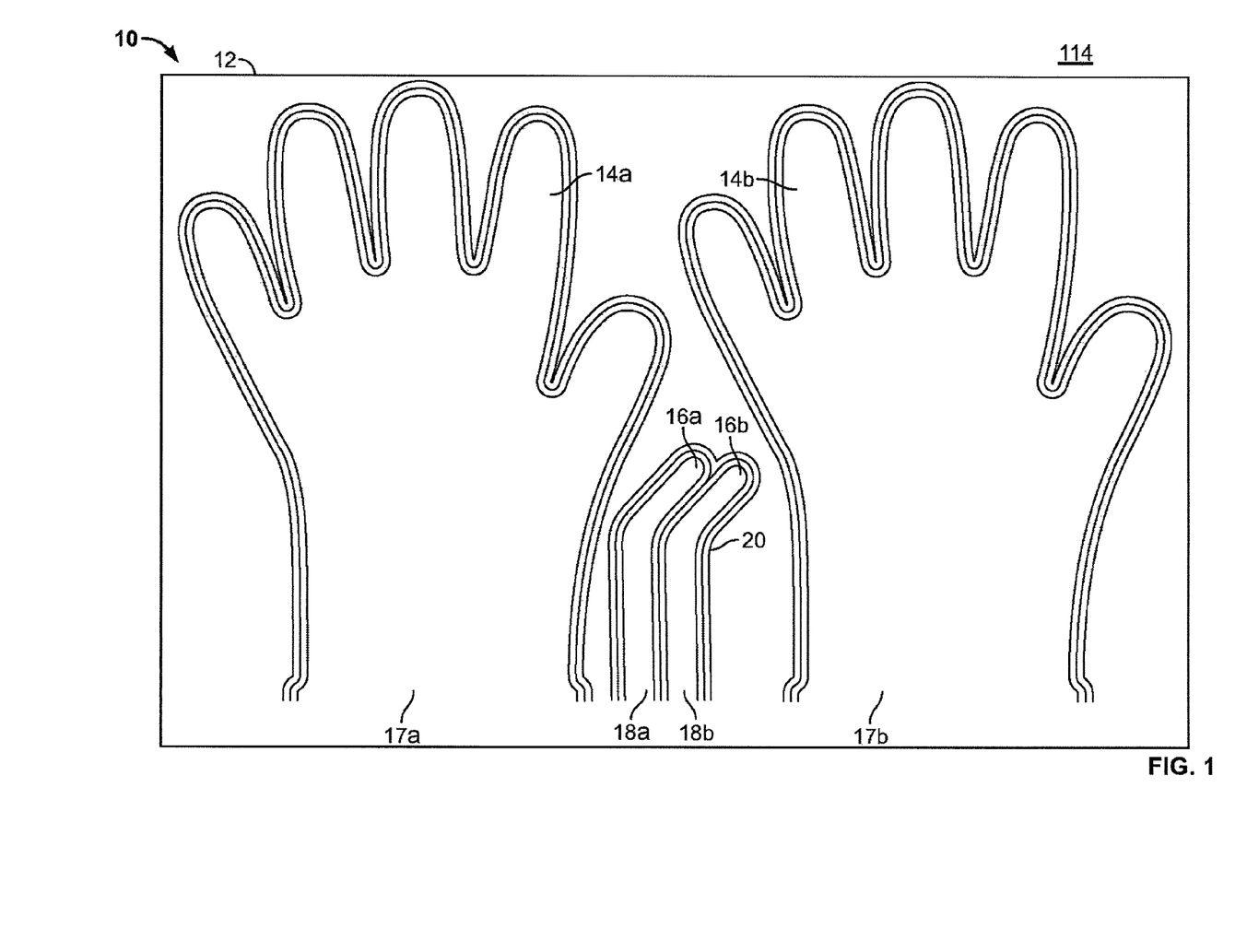
FIG. 1 shows a system according to an example embodiment of the present invention.

In accordance with another aspect of the present invention, there is provided an apparatus for manufacturing a support layer material having a pair of gloves and a pair of eyeglass arm protectors laminated thereto. The apparatus includes a rotating drum, means for passing a support layer material around the drum, means for passing a pair of heat-sealable thermoplastic film layers to the rotating drum, and means for pressing both film layers downwardly on the surface layer material rotating around the drum. A rotating die member comprises selected heated portions in the shape of a pair of gloves for heating both film layers along designated edges to form a pair of gloves laminated to the support layer material when the film layers are passed between the rotating die member and the drum. A removable die member is adapted to be removably attached to the rotating die member, the removable die member comprising portions in the shape of a pair of eyeglass arm protectors for heating both film layers along designated edges to form a pair of eyeglass arm protectors laminated to the support layer material when the film layers are passed between the removable die member and the drum. The apparatus also includes means for cutting the passing support layer material having the laminated pairs of gloves and eyeglass arm protectors to form sections of support layer material, each section having a pair of gloves and a pair of eyeglass arm protectors laminated thereto. FIG. 1 shows an example of such a "section."

In accordance with another aspect of the present invention, there is provided a method for manufacturing a support layer material having a pair of gloves and a pair of eyeglass arm protectors laminated thereto. The method includes feeding a support layer material around a rotating carrier, feeding a pair of heat-sealable thermoplastic film layers to the rotating carrier, and pressing both film layers downwardly on the surface layer material rotating around the carrier. The method also includes heating both film layers along designated edges to form a pair of gloves laminated to the support layer material, heating both film layers along designated edges to form a pair of gloves laminated to the support layer material. The fed support layer material having the laminated pairs of gloves and eyeglass arm protectors is cut to form sections of support layer material, each section having a pair of gloves and a pair of eyeglass arm protectors laminated thereto.

In accordance with another aspect of the present invention, there is provided a system for protecting eye glasses during a hair dye process. The system includes a support layer and a pair of eyeglass arm protectors removably attached to the support layer. Each eyeglass arm protector is formed as a sleeve having an open end.

In accordance with another aspect of the present invention, there is provided a system for protecting eye glasses during a hair dye process. The system includes a support layer, a pair of gloves removably attached to the support layer, and a pair of eyeglass arm protectors removably attached to the support layer, wherein each eyeglass arm protector is formed as a sleeve having an open end.

Further features and advantages of the present invention as well as the structure and operation of various aspects of the present invention are described in detail below with reference to the accompanying drawings.

BRIEF DESCRIPTION OF THE DRAWINGS

The features and advantages of the present invention will be more readily understood from a detailed description of the exemplary embodiments taken in conjunction with the following figures in which.

The invention will next be described in connection with certain exemplary embodiments; however, it should be clear to those skilled in the art that various modifications, additions, and subtractions can be made without departing from the spirit or scope of the claims.

DETAILED DESCRIPTION OF THE PREFERRED EMBODIMENTS

An example embodiment of the invention provides an improved method for protecting the arms or temple pieces of eye glasses during the hair dye process. The system and method includes providing disposable eyeglass arm protectors along with disposable gloves, both removably fixed or laminated to a sheet of paper. The gloves and/or eyeglass arm protectors may also be simply laid onto the sheet of paper without being secured in any way. The sheet of paper may be unprinted or may be printed with indicia, pictures, and/or written instructions for using the hair dye process. A manufacturing apparatus and method for producing the sheet of paper containing the arm protectors and the gloves is also disclosed. To the inventor's knowledge, existing hair care kits, be they for perms, hair coloring, or hair highlighting, have supplied a pair of gloves and an instruction sheet; however, they have never included any eyeglass arm protectors.

FIG. 1 shows an example embodiment of a system 10 provided by the present invention. The system 10 includes a sheet 12 of paper or the like, on which may be printed instructions (not shown) for using the hair dye process. The sheet 12 may be provided in folded form, and, when unfolded (as shown in FIG. 1), provides the user with a pair of gloves 14a, 14b removably attached or laminated to the sheet 12, for protecting the user's hands from the chemicals during the hair dye process. Also provided is a pair of arm sleeves or arm protectors 16a, 16b removably attached or laminated to the sheet 12, for protecting the arms of the eyeglasses, which eyeglasses may be worn by the user at times during the process. For example, the user may wear the eyeglasses, the arms of which are protected by the arm protectors 16a, 16b, when mixing the chemicals or during the predetermined waiting period. Of course, it should be understood that FIG. 1 is not necessarily drawn to scale. As one example of dimensions, the sheet 12 may be 17 inches (43.2 cm) by 11 inches (27.9 cm), and the arm protectors 16a, 16b may be 4.5 inches (11.4 cm) in length and 0.75 inches (1.9 cm) in width. Of course, this is just an example, and the present invention is not limited thereto.

The gloves 14a, 14b and the arm protectors 16a, 16b may be made from a plastic disposable material. The gloves 14a, 14b and the arm protectors 16a, 16b each comprise two layers, each layer making up a front and a back, respectively. The layers are sealed together at the edges with openings 17a, 17b for the gloves 14a, 14b and openings 18a, 18b for the arm protectors 16a, 16b. The openings 17a, 17b enable the user to insert his or her hands into the gloves 14a, 14b, and the openings 18a, 18b enable the user to insert the arms of the eyeglasses into the arm protectors 16a, 16b. Since the gloves 14a, 14b and the arm protectors 16a, 16b are disposable, the user can simply throw them away after use.

Accordingly, each of the two arm protectors 16a, 16b includes an opening 18a, 18b at one end for receiving an arm of the eyeglasses, so that the arms can be substantially covered by the arm protectors 16a, 16b. The arm protectors 16a, 16b are flexible in order to receive the arms, and the openings 18a, 18b can be made at least large enough to receive arms from all standard-sized glasses.

Reference numeral 20 indicates where the arm protectors 16a, 16b are curved or bent in order to conform to the shape of the arms of a standard pair of eyeglasses. Of course, while this is a preferred embodiment, the present invention is not limited thereto. For example, the arm protectors 16a, 16b could be straight without having such a bend to them, provided that the chosen material is flexible enough to conform to the shape of the eyeglass arms; to accomplish this alternative embodiment, a die with a straight pattern (not shown) would be used instead of a die with a bended pattern. Furthermore, the arm protectors 16a, 16b can be isolated from each other or, as shown in FIG. 1, can be attached using a perforation to separate the two pieces (this, too, would be accomplished through the design of the die). Moreover, while FIG. 1 shows the eyeglass arm protectors 16a, 16b located between the pair of gloves 14, 14b, this is of course just an example, and the eyeglass arm protectors 16a, 16b could be located elsewhere on the sheet 12, such as on each side of either glove.

The gloves 14a, 14b and the arm protectors 16a, 16b may be made from a plastic disposable material. Any protective flexible film is suitable as a material. One preferred film is a polyethylene material, using a variety of additives or combinations to help seal the product including, but not limited to, ethylene vinyl acetate (EVA), ethyl methyl acrylate (EMA), METALICINE, linear low-density polyethylene (LLDPE), high-density polyethylene (HDPE), and low-density polyethylene (LDPE). Polyurethane is a suitable material as well. Of course, the present invention is not limited to these materials, and any other suitable materials would suffice. Further, the gloves 14a, 14b and the arm protectors 16a, 16b may be made from different materials.

The film can be blown, molded or cast. A preferred gauge is 1 mm, but this is of course just an example and other thicknesses would work, providing that flexibility is maintained. Furthermore, the material used may be opaque, or, on the other hand, may be transparent so that the user can easily notice the instructions or indicia which may be printed on the sheet 12 underneath the gloves 14a, 14b and the arm protectors 16a, 16b. It is further noted that the gloves 14a, 14b and the arm protectors 16a, 16b may be of any color, such as clear, black, or pink.

By virtue of the features of the system 10 shown in FIG. 1, the user can use the gloves 14a, 14b to protect his or her hands, and can also use the arm protectors 16a, 16b to protect the arms or temple pieces of his or her eyeglasses during the hair dye process. The user can be provided with these items all in the same system 10 as shown in FIG. 1. For example, during preparation, the user is typically required to snip off the tip of the applicator cap, remove the applicator cap from the bottle, and pour chemicals from another bottle into the applicator bottle. The ability of the user to wear his or her eyeglasses during this process can be quite advantageous.

Furthermore, in using this system 10, the user can wear his or her glasses during the predetermined waiting period rather than having to go without the glasses for the duration of that period. This is because the user does not have to worry that the arms of the eyeglasses will be stained or discolored. Accordingly, the user does not have to either go without glasses during the waiting period or wear a backup pair.

An apparatus and method for manufacturing a system such as the system 10 shown in FIG. 1 will now be described with further reference to FIGS. 2 and 3. It is noted that the system 10 can be for self use or home use, or for use by a professional in the hair coloring field (e.g., a specialist in a beauty parlor). The eyeglass arm protectors 16a, 16b can be provided along with the gloves 14a, 14b, both laminated onto the sheet 12 as shown in FIG. 1.

In this example embodiment, as described in more detail below in connection with FIG. 3, the apparatus concurrently feeds a plurality of heat-sealable plastic sheets and a layer of paper for fabricating a multi-component article of manufacture 10. The multi-component article of manufacture 10 comprises a unitary package made of a disposable plastic material secured or laminated to an absorbent material such as the sheet of paper 12. Accordingly, the present invention, in a broad aspect, provides a method and apparatus for fabricating a multi-component article of manufacture wherein the several components are readily disposable after a single usage.

The system 10 is in effect a multi-component article comprised of a support layer in the form of sheet 12 such as paper, toweling, or the like, on which is superimposed a plurality of heat-sealed products including the disposable plastic gloves 14a, 14b and the pair of arm protectors 16a, 16b. It is of course to be understood that the invention is not limited to this example, and that various modifications may be made.

Figures 2, 3:
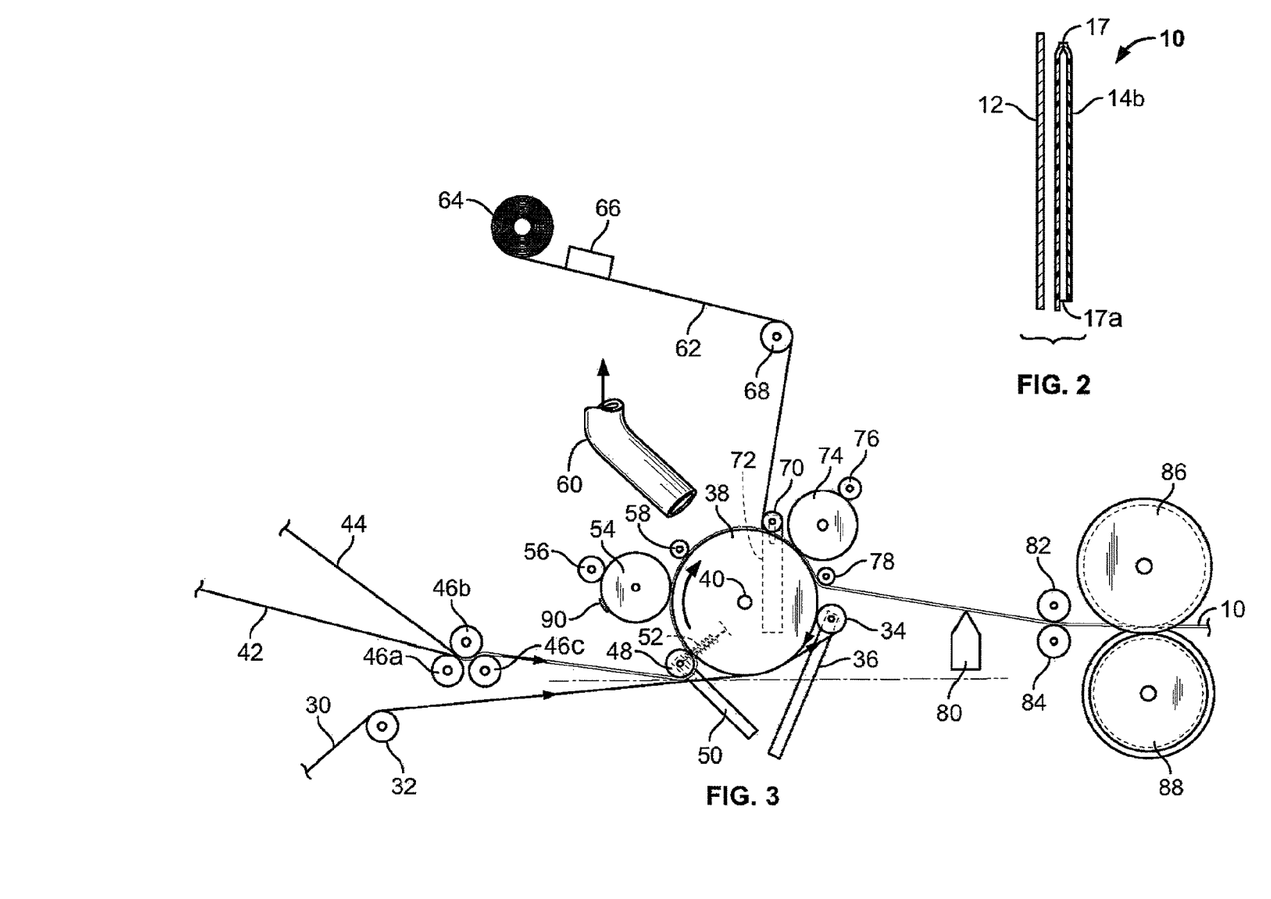
FIG. 2 is a side view of the system shown in FIG. 1.
FIG. 3 shows an example embodiment of the apparatus that is used for accomplishing the manufacturing method of the present invention.

FIG. 2 is a side view of the system or article of manufacture 10 shown in FIG. 1. The article of manufacture 10 includes the paper-like backing sheet 12 that can be adapted to have indicia or suitable instructions imprinted thereon. Also shown is the side of disposable plastic glove 14b. (Disposable plastic glove 14a and eyeglass arm protectors 16a, 16b are not visible in this view.) The marginal edges 17 of the gloves 14a and 14b, with the exception of the edge 17a through which the hand is adapted to be inserted, are heat-sealed to each other. The marginal edges of the arm protectors 16a and 16b, with the exception of the openings 18a, 18b, are also heat-sealed to each other, although, again, this is not visible in FIG. 2.

FIG. 3 shows an example embodiment of the apparatus that is used for accomplishing the manufacturing method of the present invention and for forming the article of manufacture 10 of the present invention. A first web 30 of a flexible moisture absorbent material, such as paper that is adapted to form a support layer, is passed over a tension roller 32 which is suitably designed for rotation. The web of paper 30 then passes over and almost completely around a lay-on roller 34 that is rotatably mounted on a pivotally supported arm 36. The roller 34 applies the paper to the peripheral surface of a carrier such as a drum 38 that is adapted to rotate about an axle 40. Suitable means such as a motor (not shown) may be used for driving the drum 38.

Concurrently with the feeding of the paper web 30, a pair of heat-sealable, thermoplastic film layers 42 and 44 are passed through a plurality of tension rollers 46a, 46b, and 46c that transport the two layers 42 and 44 to an adjustable lay-on roller 48 which is pivotally mounted on an arm 50. Spring means 52 bias the roller 48 in the direction towards the peripheral surface of the drum 38 so that both film layers 42 and 44 are pressed downwardly on the surface of the paper web 30.

While the drum 38 rotates, the paper layer 30 and the film layers 42 and 44 are carried by the peripheral surface thereof past a die member 54 that is provided with selected heated portions in the shape of the desired article. In the embodiment described herein the heated portions of the die member 54 will have the shape of the gloves 14a and 14b shown in FIG. 1. When the film layers 42 and 44 are passed between the peripheral surfaces of the rotating die member 54 and the drum 38, the heat from the die member will heat seal the two layers 42 and 44 along the lines designated 17 in FIG. 2 to thereby form the gloves 14a and 14b. A roller 56 that is adapted to apply a suitable mold release agent such as silicone may be provided in contact with the peripheral surface of the heated die member 54.

Figure 4:
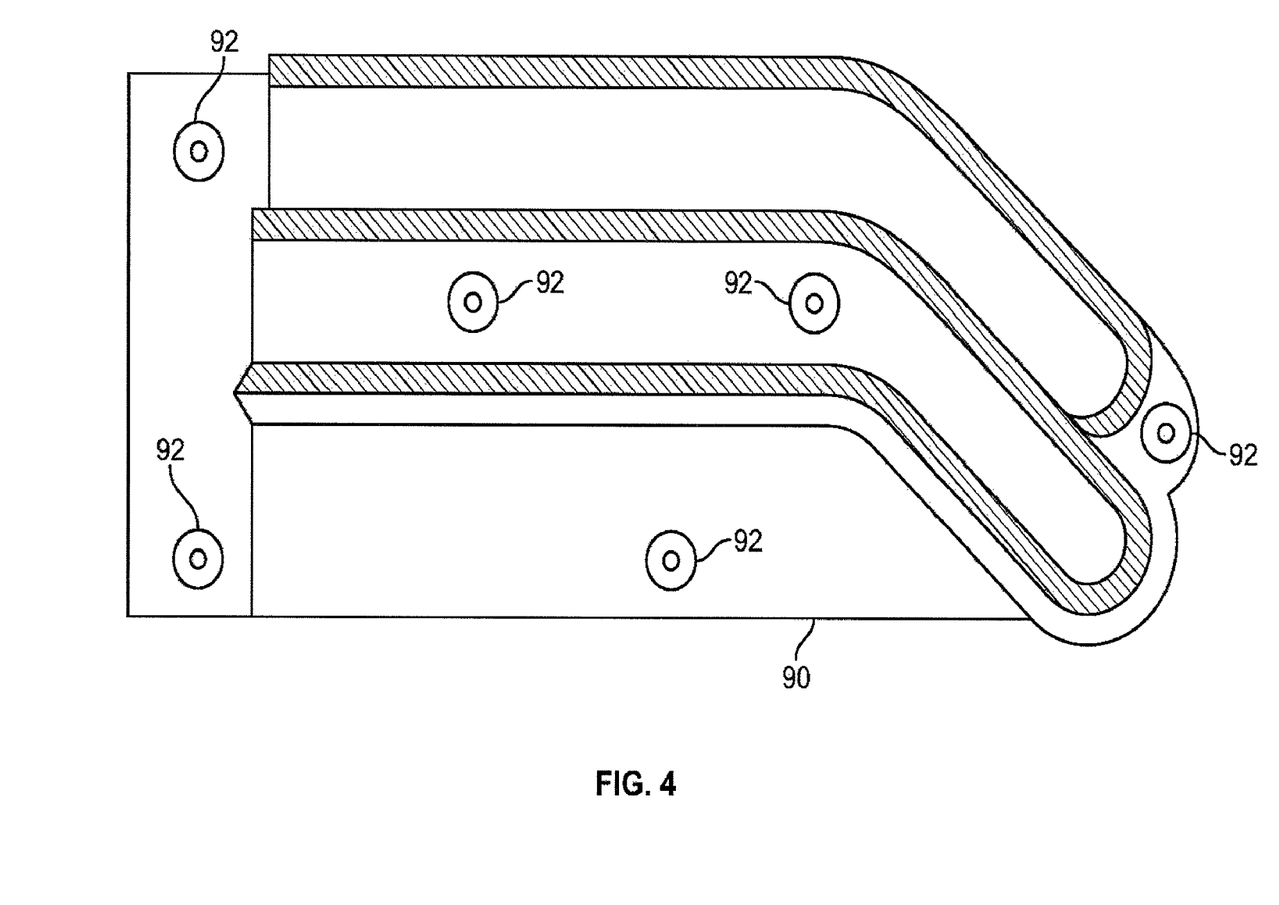
FIG. 4 shows a close-up view of the removable die of FIG. 3 for forming the arm protectors, not attached to the heated die member, according to an example embodiment.

The apparatus and method of the present invention provide a novel technique of forming the eyeglass arm protectors 16a, 16b along with the gloves 14a, 14b on the backing sheet 10. In particular, a removable die 90 is provided, an example embodiment of which is shown in FIG. 4, for forming the arm protectors 16a, 16b. The removable die 90 is removably attachable to the rotating die member 54 (described above for forming the gloves 14a, 14b). Thus, the removable die 90 is an interchangeable piece in that it can easily come "on" and "off" the rotating die member 54, depending on whether it is desired to manufacture the arm protectors 16a, 16b with the gloves 14a, 14b on the sheet 12. The removable die 90 uses suitable fastening means such as screws, for example, which may slide through holes 92 to be received by holes of the heated die member 54, to attach the removable die 90 to the heated die member 54. Of course, the invention is not limited to this example, and the rotating die member 54 and the removable die 90 could be permanently integrated into a single piece.

The removable die 90 comprises portions in the shape of a pair of eyeglass arm protectors for heating both film layers along designated edges to form a pair of eyeglass arm protectors, laminated to the sheet 12, when the film layers are passed between the removable die member and the drum.

Preferably (as can be seen in FIG. 1), a distance is maintained in the manufacturing process between the gloves 14a, 14b and the arm protectors 16a, 16b. This is advantageous because it allows the gloves 14a, 14b and the arm protectors 16a, 16b to be manufactured without being too close to each other. If the gloves 14a, 14b and the arm protectors 16a, 16b were manufactured too close together, areas of scrap may be created that may not be easily suctioned off by the scrap removal system 60 (described below). For example, an area of scrap would be created to the right of eyeglass arm protector 18b in FIG. 1, in the area where the reference numeral "20" is printed; another area of scrap would be created on the opposite side, i.e., to the left of eyeglass arm protector 18a, below the bend. Such areas of scrap would likely not easily be suctioned off by the scrap removal system, which would leave extra material on the sheet 12 which has no purpose and which could confuse the user since the user may not realize that it is scrap. However, by maintaining a distance in the manufacturing process between the gloves 14a, 14b and the arm protectors 16a, 16b as described herein, all of the scrap can be suctioned off and recycled.

Typically, cosmetics or hair care companies have high-speed lines that produce their hair care kits that are sold to customers. Various components of the kits, such as a printed instruction sheet to which a pair of disposable gloves is attached, are typically manufactured by other companies and then incorporated into the high-speed lines in order to create the final product. By virtue of the present invention, a company that is currently manufacturing a sheet of paper to which a pair of disposable gloves is attached can easily incorporate the removable die 90 of the present invention into its existing system without otherwise altering the existing system; thus, the company can easily manufacture a sheet of paper to which a pair of disposable gloves and also a pair of disposable eyeglass arm protectors are attached. Furthermore, cosmetics or hair care companies will not need to adjust, change, or otherwise alter their high speed lines at all in order to produce their hair care kits that also include the eyeglass arm protectors as described.

Accordingly, using the manufacturing system and method described herein, companies currently manufacturing a printed instruction sheet to which a pair of disposable gloves is attached, for example, can modify the tooling of their die by adding removable segments that can change the base tool and add features at the manufacturer's discretion. This is not done with conventional systems that seal and cut plastic or non-woven type products in a continuous process.

Such conventional systems are basically two-part systems in which the material is sealed with heat with a set of tooling and then cut in a second stage by a second set of tooling. For example, a conventional system may use an ultra-sonic head to seal the product and then cut the final product in a second station in register. With the present invention, however, the manufacturing apparatus is able to seal with heat and cut with heat in a single station with one die; the shape of the die cuts the product and the heat of the die (supplied, for example, by heat rods through the die) seals the product through a melting process.

Hair care companies can thereby add value to their hair care packages with little or no extra cost. It is of course to be understood that while the present invention is described in terms of a sheet 10 on which disposable plastic gloves 14a, 14b and eyeglass arm protectors 16a, 16b are attached, the invention is not limited thereto and articles other than gloves 14a, 14b or eyeglass arm protectors 16a, 16b could be manufactured using the techniques described herein.

Referring again to FIG. 3, downstream of the heated die member 54 and the removable die 90, in the direction of rotation of the drum member 38, there is provided a film and paper support roller 58 that serves to retain the formed gloves 14a, 14b and arm protectors 16a, 16b on the surface of the paper web 30. The remainder of the material of the film layers 42 and 44 not forming the gloves 14a, 14b and arm protectors 16a, 16b is removed by a scrap removal system generally designated by the reference character 60, which is adapted to apply suction to the non-formed plastic layers. In this regard, the arm protectors 16a, 16b as well as the shape of the gloves 14a, 14b (be they small, medium or large) should have a workable pattern and design, utilize a suitable material, and be positioned in a precise manner so that the components can fit on the carrier or sheet 12 being used; in this way, when the "scrap" gets suctioned off by the scrap removal system 60, the scrap removal system 60 doesn't pull with it the arm protectors 16a, 16b or the gloves 14a, 14b. The present invention is further advantageous in that it essentially uses what would otherwise be "scrap" to produce the arm protectors 16a, 16b.

While not necessary to manufacture the article 10 of the example embodiment of this invention, if desired other layers can be added to the manufacturing process, such as a disposable plastic bag/heat cap formed over the gloves 14a, 14b and the eyeglass arm protectors 16a, 16b, worn by the user to expedite the chemical reaction of the hair dye. To this end, the apparatus shown in FIG. 3 can apply still another layer of heat-sealable thermoplastic material 62 to the moving drum 38, to form the added layer such as the bag. It is convenient to provide the web 62 from a double width source 64 and then pass the material over a conventional folder 66 that is well known in the art. The folded-over web 62 passes over a tension roller 68 and then an adjustable film lay-on roller 70 that is pivotally supported on an arm 72. Thus, as shown in FIG. 3, a double thickness web 62 can be positioned over the formed layers 42, 44, if desired. Downstream of the film lay-on roller 70 there may be provided another die member 74 having a heated portion that is adapted to form transverse seal lines for the optional layer of the article such as the bag/cap. If also desired, a roller 76 that is adapted to carry a supply of a mold release agent such as silicone may be placed in contact with the peripheral surface of the second heated die member 74. A support roller 78 downstream of the die member 74 maintains the layers of plastic film 42, 44, and 62 (if used) against the paper web 30.

A sensor 80, a pair of draw rollers 82 and 84, and cut-off means 86 and 88 are provided downstream of the support roller 78 in order to separate each of the articles 10 from the remainder of their respective webs. Accordingly, the articles 10 are cut into sections, each section including for example a sheet 12 of paper, a pair of gloves 14a, 14b, and a pair of eyeglass arm protectors 16a, 16b, as shown in FIG. 1. After the articles 10 get cut, they may be folded by a folding machine (not shown) according to the desired specifications. Means not shown may also be provided for collecting the cut-off articles 10. It is further noted that additional articles may be formed in successive layers by providing additional rotary dies 54, 74 and plastic sheets 42, 44, and 62. The uppermost articles would have larger perimeters than that of the lower layers.

Figure 5:
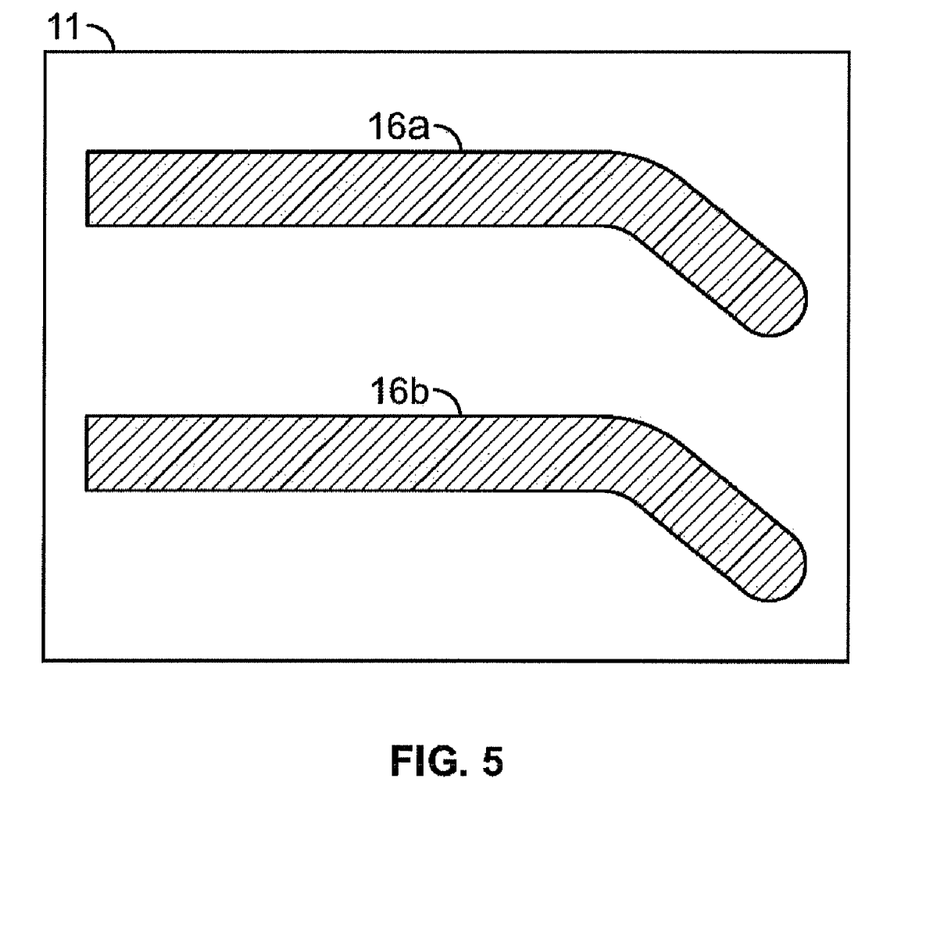
FIG. 5 shows another example embodiment in which the eyeglass arm protectors are manufactured separately and are laminated to a sheet.

FIG. 5 shows another example aspect in which the eyeglass arm protectors 16a, 16b are manufactured separately and are laminated to a sheet 11 of paper or the like that may be smaller than sheet 10 due to a pair of gloves not being present. Laminating the eyeglass arm protectors 16a, 16b to the sheet 11 rather than providing them individually can ensure that they do not fall off the sheet and become lost, which may otherwise happen due to their relatively small size. The eyeglass arm protectors 16a, 16b are easily removable from the paper.

In this example embodiment, a separate die would be used that has only the shape of the arm protectors 16a, 16b on it. The die would be interchangeable such that it is used with a die machine. The die would have heating rods embedded therein to heat the die.

The manufacturing apparatus shown in FIG. 3 or any part(s) or function(s) thereof may be controlled using hardware, software, or a combination thereof, which may be implemented in one or more computer systems or other processing systems. Useful machines for controlling the operations of the present invention include general purpose digital computers or similar devices. Computer programs (also referred to as computer control logic) can be stored in a memory and, when executed, can control the manufacturing apparatus to perform the features of the present invention, as discussed herein. The software may be stored in a computer program product and loaded into a computer system using a removable storage drive, a hard drive, or a communications interface. The control logic (software), when executed by a processor, can cause the processor to control the apparatus for performing the functions of the invention as described herein. A computer program medium or computer usable medium may be used as the removable storage drive, as a hard disk installed in the hard disk drive, or as signals. These computer program products provide software to the computer system.

While the invention has been particularly shown and described with respect to a preferred embodiment thereof, it should be understood that the embodiment has been presented by way of example, and not limitation. It will be apparent to persons skilled in the relevant art(s) that various changes in form and detail can be made therein without departing from the spirit and scope of the present invention. Thus, the present invention should not be limited by any above-described exemplary embodiment, but should be defined only in accordance with the following claims and their equivalents.

For example, while FIG. 1 shows only one pair of gloves 14a, 14b and one pair of eyeglass arm protectors 16a, 16b on the sheet 10, multiple pairs of gloves and/or eyeglass arm protectors can be manufactured on the same sheet. Such an end product can be useful if, for example, a second coloring application is needed, or if the first pairs need to be discarded for some reason.

As another example, as noted above, the eyeglass arm protectors and/or the gloves would simply be laid onto the sheet of paper without being secured thereto. A method for making such a system according to an example aspect of the invention would include laying down a sheet of paper that is cut to the desired size (and printed if also desired), laying down onto the sheet eyeglass arm protectors (and gloves, if desired), and folding the resulting sheet.

Moreover, while the apparatus of FIG. 3 is a rotary machine, the impressing can also be made by other types of machines, including machines that implement a hydraulic, flatbed die which uses a radio frequency (RF) welding technique, for example.

It should also be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Having described the invention, what is claimed as new and secured by Letters Patent is:

What is claimed is:

1. A system for protecting arms of eye glasses during a hair dye, coloring, or highlighting process, comprising:
   a support layer;
   a pair of gloves on the support layer; and
   a pair of eyeglass arm protectors on the support layer, wherein each eyeglass arm protector is formed as a sleeve having an open end.

2. The system as set forth in claim 1, wherein the gloves and the eyeglass arm protectors are laminated onto the support layer.

3. The system as set forth in claim 2, wherein each glove and each eyeglass arm protector has designated edges that are laminated to the surface layer.

4. The system as set forth in claim 1, wherein the gloves and the eyeglass arm protectors are laid onto the support layer without being secured thereto.

5. The system as set forth in claim 1, wherein the support layer comprises a sheet of paper.

6. The system as set forth in claim 1, wherein the gloves are made from a material comprising at least one of polyethylene and polyurethane.

7. The system as set forth in claim 1, wherein the eyeglass arm protectors are made from a material comprising at least one of polyethylene and polyurethane.

8. The system as set forth in claim 1, wherein the pair of eyeglass arm protectors are located between the pair of gloves on the support layer.

9. The system as set forth in claim 1, wherein each eyeglass arm protector is formed in a curved shape.

10. The system as set forth in claim 1, wherein the gloves and the eyeglass arm protectors are each comprised of two layers having designated edges that are heat sealed together and having another designated edge that is an open edge.

11. A system for protecting arms of eye glasses during a hair dye, coloring, or highlighting process, comprising:
   a support layer;
   a pair of gloves removably attached to the support layer; and
   a pair of eyeglass arm protectors removably attached to the support layer, wherein each eyeglass arm protector is formed as a sleeve having an open end.

* * * * *